(12) United States Patent
Nam

(10) Patent No.: US 7,678,466 B2
(45) Date of Patent: Mar. 16, 2010

(54) FLOORING HAVING SURFACE LAYER OF SYNTHETIC RESIN AND WOOD-BASED BOARD

(75) Inventor: Seung-Baik Nam, Cheongju-si (KR)

(73) Assignee: LG Chem, Ltd. (KR)

( * ) Notice: Subject to any disclaimer, the term of this patent is extended or adjusted under 35 U.S.C. 154(b) by 995 days.

(21) Appl. No.: 11/106,207

(22) Filed: Apr. 14, 2005

(65) Prior Publication Data

US 2005/0281986 A1 Dec. 22, 2005

(30) Foreign Application Priority Data

Jun. 22, 2004 (KR) .................. 20-2004-0017566 U

(51) Int. Cl.
| B32B 27/06 | (2006.01) |
| B32B 3/00 | (2006.01) |
| B32B 21/04 | (2006.01) |
| E04C 2/24 | (2006.01) |
| E04F 15/16 | (2006.01) |
| E04F 15/18 | (2006.01) |

(52) U.S. Cl. .................. 428/480; 428/172; 428/211.1; 428/535; 428/537.1; 428/537.5; 52/309.13; 52/390; 52/403.1

(58) Field of Classification Search .................. 428/172, 428/204, 206, 207, 537.1, 537.5, 211.1, 480, 428/535; 52/390, 403.1, 309.13
See application file for complete search history.

(56) References Cited

U.S. PATENT DOCUMENTS

| 5,736,227 | A | * | 4/1998 | Sweet et al. | ................. 428/192 |
| 2002/0136862 | A1 | * | 9/2002 | Dong et al. | ................. 428/150 |
| 2003/0129362 | A1 | * | 7/2003 | Simon et al. | ................. 428/172 |
| 2004/0033332 | A1 | | 2/2004 | Park et al. | ..................... 428/79 |

* cited by examiner

*Primary Examiner*—Donald Loney
(74) *Attorney, Agent, or Firm*—Cantor Colburn LLP

(57) ABSTRACT

Disclosed herein is a flooring comprising a surface layer made of a synthetic resin, and a wood-based board as a base. Preferably, the surface layer includes a printed layer formed by general gravure, transfer, heat-sublimation, silk screen or digital printing using a printer, a protective made of a synthetic resin, and a UV-curable or heat-curable surface treatment layer. The wood-based board is selected from plywood, medium-density fiberboard (MDF), high-density fiberboard (HDF), particle board, and resin-wood flour composite board. The flooring may further comprise a bottom layer laminated under the wood-based board for protecting the flooring against moisture from the bottom. The flooring is cut into pieces having an appropriate size, and the pieces are processed into a finished product in a tongue and groove (T & G) shape.

8 Claims, 2 Drawing Sheets

FLOORING HAVING SURFACE LAYER OF SYNTHETIC RESIN AND WOOD-BASED BOARD

TECHNICAL FIELD

The present invention relates to a flooring comprising a surface layer made of a synthetic resin, and a wood-based board selected from plywood, medium-density fiberboard (MDF), high-density fiberboard (HDF), particle board and resin-wood flour composite board as a base layer.

BACKGROUND ART

A variety of flooring products are widely used. Of these, a plywood flooring for an under-floor heating system having small dimensional deformation is known, which is produced by laminating one or more natural wood veneers to each other to form a waterproof plywood as a base, integrally forming a natural veneer on the base by using an adhesive, and coating a surface treatment agent, such as urethane acrylate, on the natural veneer to form a surface treatment layer.

The conventional plywood flooring for an under-floor heating system is produced simply by laminating a veneer on a plywood and coating the surface of the veneer in order to maximize the natural texture of the plywood flooring. However, in the case where a heavy or sharp object drops onto the surface of the plywood flooring, damage to the surface, such as indentation, is observed due to limited physical properties of the natural veneer.

In addition to the plywood flooring, there is known a laminate flooring product comprising an MDF or HDF layer as a base, a printed layer impregnated with a melamine resin formed on the base, and a surface treatment layer made of melamine formed on the printed layer.

However, since the conventional laminate flooring uses a thermosetting melamine resin as a surface material, the surface is likely to be brittle. Accordingly, when a sharp or heavy object having above specified load drops onto the laminate flooring, the impact site is partly damaged, e.g., broken or indented.

In addition, since the conventional laminate flooring uses a melamine resin as a surface material, the dimensional stability is poor due to ambient atmospheric conditions, e.g., moisture and temperature. To compensate for poor dimensional stability, an additional balance layer must be formed on the bottom surface of the laminate flooring, result in a structural disadvantage.

DISCLOSURE

Technical Problem

The present invention has been made in view of the above problems of the prior art floorings, and it is an object of the present invention to provide a flooring having improved surface physical properties such that the surface of the flooring is protected against damage, e.g., indentation and breakage, caused by a heavy or sharp object.

It is another object of the present invention to provide a flooring having a natural texture without the use of natural veneer, which is thus advantageous in terms of natural resource preservation.

It is still another object of the present invention to provide a flooring having a stabilized dimensional variation against ambient atmospheric conditions, e.g., moisture and temperature.

Technical Solution

In order to accomplish the above objects of the present invention, there is provided a flooring comprising a wood-based board as a base and a surface layer laminated thereon wherein the surface layer includes a protective layer made of a synthetic resin.

The flooring of the present invention is characterized in that it has improved surface physical properties such that its surface is protected against damage, e.g., indentation and breakage, caused by a heavy or sharp object. To this end, the surface layer is preferably made of a synthetic resin showing superior mechanical properties and having an elongation sufficient to absorb an external impact. As the synthetic resin, there can be used, for example, polyvinyl chloride (PVC), polyethylene (PE), polypropylene (PP), polyethylene terephthalate (PET), glycol-modified polyethylene terephthalate (PETG), high-impact polystyrene (HIPS), acrylonitrile-butadiene-styrene (ABS), polyurethane (PU), styrene-butadiene-styrene (SBS) block copolymer, styrene-ethylene-butylene-styrene (SEBS) block copolymer, syndiotactic polystyrene (SPS), or styrene-ethylene-propylene-styrene (SEPS) block copolymer.

It is preferred that the surface layer includes a printed layer, a protective layer, and a surface treatment layer. For better surface physical properties, the synthetic resin is preferably used to form the printed layer and/or the protective layer, particularly, the protective layer.

A preferred composition of the protective layer comprises 10~50 parts by weight of a plasticizer for controlling the hardness of the protective layer or ethylene vinyl acetate (EVA), and 1~5 parts by weight of a processing lubricant, and 100 parts by weight of at least one synthetic resin selected from PVC, PE, PP, PET, PETG, HIPS, ABS, PU, SBS, SEBS, SPS and SEPS.

The printed layer is formed to impart printing effects, e.g., printed wood, marble and other patterns, to the flooring of the present invention. Since the printed layer provides a natural texture without the use of natural veneer, natural resources can be advantageously preserved.

In one embodiment of the present invention, the printed layer consists of a base layer for printing made of a synthetic resin and a printed surface formed on the base layer.

In another embodiment of the present invention, the printed layer is formed of a printed paper or a resin-impregnated printed paper obtained by printing a paper and impregnating the printed paper with a synthetic resin.

In yet another embodiment of the present invention, the printed layer consists of a glass fiber layer formed by impregnating a glass fiber sheet with a synthetic resin, a base layer for printing made of a synthetic resin laminated on the glass fiber layer, and a printed surface formed on the base layer.

The wood-based board used as a base of the flooring according to the present invention is at least one board selected from waterproof plywood, medium-density fiberboard (MDF), high-density fiberboard (HDF), particle board, and resin-wood flour composite board.

The flooring of the present invention may further comprise a bottom layer laminated under the wood-based board. The bottom layer is formed of at least one material selected from papers, silicone-based water repellents, silicone-based waterproofing agents, and synthetic resins.

The synthetic resin used as a material for the printed layer of the surface layer and the bottom layer is at least one polymer selected from PVC, PE, PP, PET, PETG, HIPS, ABS, PU, SBS, SEBS, SPS, SEPS, and acrylates.

Taking into consideration the ease of fabrication, the flooring of the present invention is preferably processed to have a tongue and groove (T & G) shape. In addition, the surface layer can be embossed such that three-dimensional pattern effects are maximized.

DESCRIPTION OF DRAWINGS

The above and other objects, features and other advantages of the present invention will be more clearly understood from the following detailed description taken in conjunction with the accompanying drawings, in which.

BEST MODE

The present invention will now be described in more detail with reference to the accompanying drawings.

Figure 1:
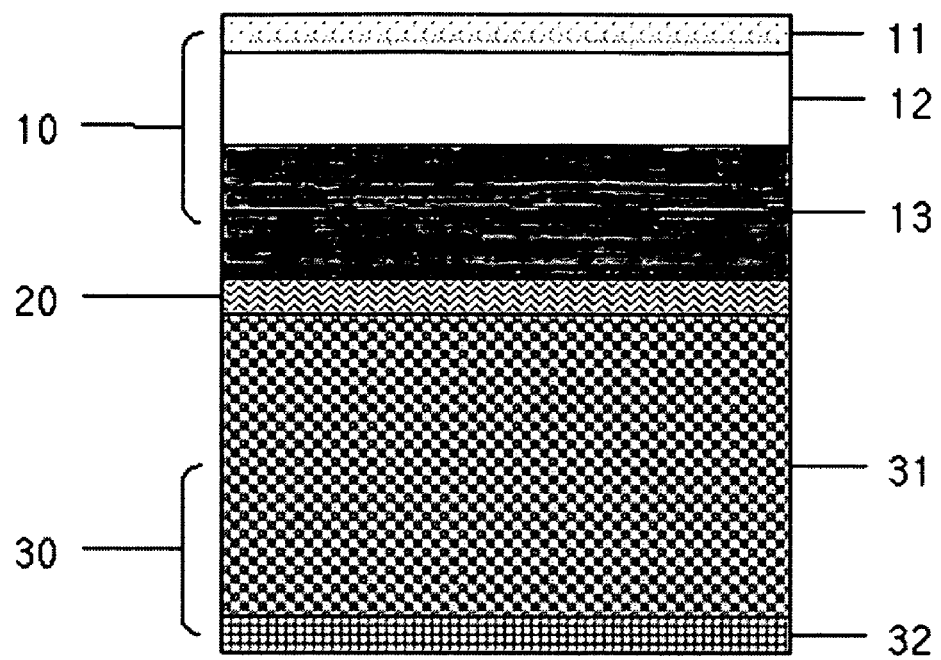
FIG. 1 is a cross-sectional view showing the overall structure of a flooring according to the preferred embodiment of the present invention.

The overall structure of a flooring according to the preferred embodiment of the present invention is shown in FIG. 1. Referring to FIG. 1, the flooring largely comprises a surface layer 10, a base layer 30, and an adhesive layer 20 adhering the two layers together. The surface layer 10 includes a printed layer 13 on which a pattern, e.g., wood, marble or the like, is printed, a protective layer 12 made of a synthetic resin for protecting the printed surface of the printed layer, and a surface treatment layer 11 laminated in this order from the bottom. The base layer 30 includes a bottom layer 32 and a wood-based board 31 laminated thereon. The printed layer 13 has the following three structures.

Figure 2:
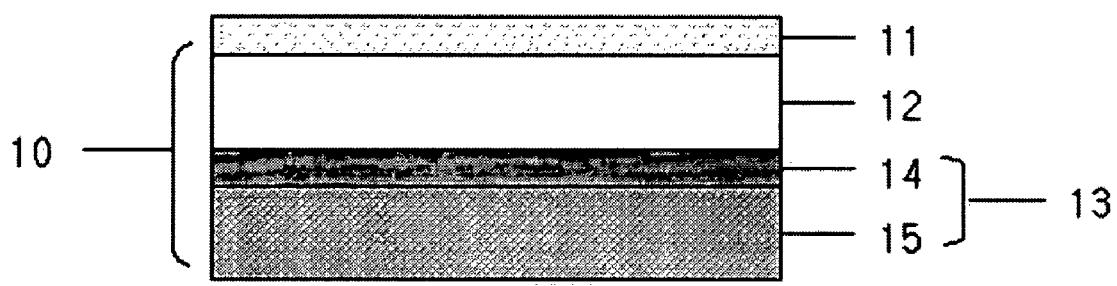
FIG. 2 is a cross-sectional view showing a surface layer according to one embodiment of the present invention.

Referring to FIG. 2, there is shown a cross-sectional view of a surface layer 10 according to one embodiment of the present invention. The surface layer 10 includes a printed layer 13, a protective layer 12, and a surface treatment layer 11 laminated in this order from the bottom wherein the printed layer 13 consists of a base layer 15 for printing made of a synthetic resin and a printed surface 14 formed on the base layer 15.

Figure 3:
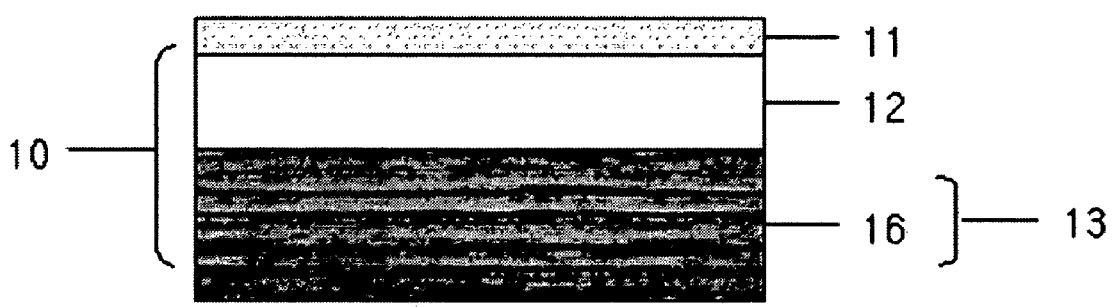
FIG. 3 is a cross-sectional view showing a surface layer according to another embodiment of the present invention.

FIG. 3 is a cross-sectional view showing a surface layer according to another embodiment of the present invention. As shown in FIG. 3, the surface layer 10 includes a printed layer 13, a protective layer 12, and a surface treatment layer 11 laminated in this order from the bottom wherein the printed layer 13 is formed of a printed paper or a resin-impregnated printed paper 16 obtained by printing a paper and impregnating the printed paper with a synthetic resin.

Figure 4:
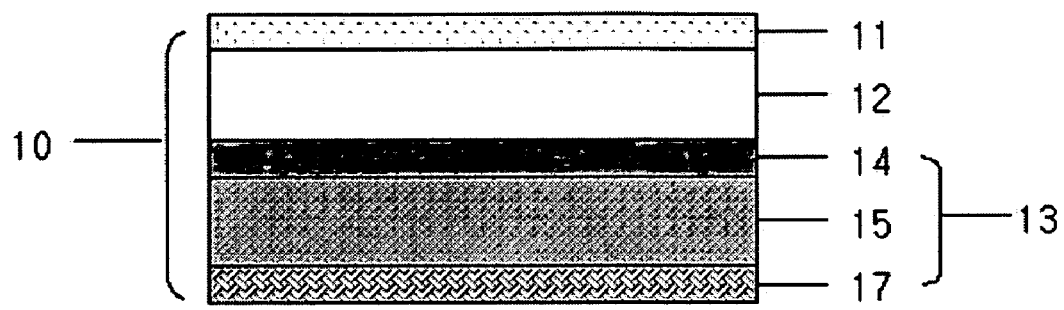
FIG. 4 is a cross-sectional view showing a surface layer according to another embodiment of the present invention.

FIG. 4 is a cross-sectional view showing a surface layer according to another embodiment of the present invention. As shown in FIG. 4, the surface layer 10 includes a printed layer 13, a protective layer 12, and a surface treatment layer 11 laminated in this order from the bottom wherein the printed layer 13 consists of a glass fiber layer 17 formed by impregnating a glass fiber sheet with a synthetic resin, a base layer for printing 15, and a printed surface 14 laminated in this order from the bottom.

Figure 5:
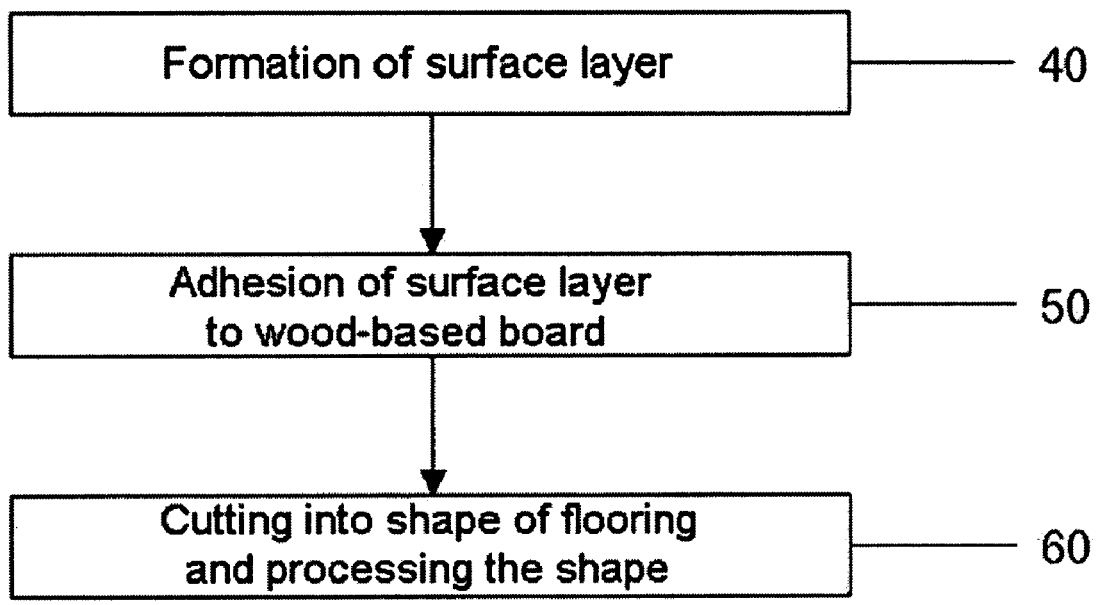
FIG. 5 is a flow chart showing a process for producing a flooring of the present invention.
Figure 6:
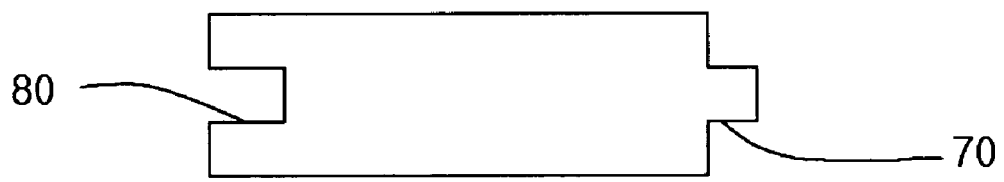
FIG. 6 is a diagram showing a finished product in a tongue and groove (T & G) shape processed from a flooring of the present invention.

FIG. 5 is a flow chart showing a process for producing the flooring of the present invention. The flooring of the present invention is produced through the following three steps. First, a printed layer 13 on which a pattern is printed and a protective layer 12 are thermally laminated at 120~150° C. or are adhered together using a transparent adhesive, and then a UV-curable or heat-curable surface treatment layer 11 made essentially of urethane acrylate is coated thereon, achieving formation of a surface layer 10 (first step 40). Before or after coating of the surface treatment layer 11, embossing can be carried out in an appropriate manner to impart a predetermined embossed shape to the entire surface or a portion of the surface layer. In the formation of the surface layer 10 in the first step, the coating of the surface treatment layer 11 may be omitted depending on the intended application of the finished product.

The protective layer 12 is a functional layer for providing improved surface physical properties to the flooring of the present invention while protecting the printed layer 13. The protective layer 12 is transparent or semi-transparent so that the printed pattern of the printed layer 13 is visible, and is preferably composed of 10~50 parts by weight of a plasticizer or EVA, 1~5 parts by weight of a processing lubricant, and 100 parts by weight of at least one synthetic resin selected from PVC, PE, PP, PET, PETG, HIPS, ABS, PU, SBS, SEBS, SPS and SEPS.

In the first step, the printed layer 13 may be formed by forming a printed surface 14 on a base layer for printing 15 made of a thermoplastic synthetic resin by gravure, transfer, sublimation, silk screen, or digital printing using a printer (FIG. 2); the printed layer 13 may be formed of a resin-impregnated printed paper 16 obtained by printing a paper via the printing technique and impregnating the printed paper with an acrylate or a thermoplastic resin (FIG. 3); or the printed layer 13 may be formed by forming a base layer for printing 15 on a glass fiber layer 17 impregnated with a PVC resin and forming a printed surface on the base layer by the printing technique (FIG. 4).

A specific composition of the base layer for printing 15 comprises 100 parts by weight of a thermoplastic synthetic resin selected from PVC, PE, PP, PET, PETG, HIPS, ABS, PU, SBS, SEBS, SPS and SEPS, 10~50 parts by weight of a plasticizer or EVA, 0~200 parts by weight of calcium carbonate ($CaCO_3$) as a filler, and if necessary 1~5 parts by weight of a processing lubricant.

The surface layer 10 formed in the first step is adhered to a base layer 30 using an epoxy- or polyurethane-based adhesive (second step 50). As a wood-based board 31 of the base layer 30, there is used at least one board selected from waterproof plywood, particle board, MDF, HDF, and resin-wood flour composite board.

A paper, including a parchment paper mainly used as a material for a lower layer of a general laminate flooring, a melamine resin-impregnated paper, or a general resin coating layer is used to form a bottom layer 32. The bottom layer 32 can be formed before or after adhesion of the base layer 30 to the surface layer 10. The formation of the bottom layer 32 may be omitted depending on the intended application of the finished product.

The laminated panel produced in the second step is cut into pieces having a size of a general flooring, and the four sides of the pieces are processed in the length and width directions to have two tongues 70 and two grooves 80, thus achieving the final appearance of the finished flooring product (third step 60).

EXAMPLE

A base layer 30 was formed by coating HDF as a wood-based board 31 with a synthetic resin as a bottom layer 32. A printed layer 13 and a protective layer 12, each of which was composed of 100 parts by weight of PETG and 30 parts by weight of EVA, and a UV-curable surface treatment layer 10 were sequentially laminated to form a surface layer 10. The surface layer 10 was laminated on the base layer 30 to produce a flooring having a structure shown in FIG. 1.

The surface physical properties of the flooring according to the present invention (Example) were compared with those of a conventional plywood flooring in which a natural veneer was laminated on a waterproof plywood as a base (Comparative Example 1) and a conventional laminate flooring in which a surface layer made of a melamine resin was laminated on MDF or HDF as a base (Comparative Example 2). The results are shown in Table 1 below.

TABLE 1

| Tests | Comparative Example 1 | Comparative Example 2 | Example |
|---|---|---|---|
| Surface indentation | 10 cm | 50 cm | 100 cm |
| Surface breakage | 20 cm | 30 cm | 150 cm |

The surface indentation properties were evaluated by dropping a straight screwdriver weighing 110 g onto the surface of the floorings and measuring a height at which surface indentation was observed. As is apparent from the data shown in Table 1, the surface of the laminate flooring in which a thermosetting melamine resin was used as a material for a surface layer (Comparative Example 2) was indented when the straight screwdriver was dropped from a height of 50 cm, while the surface of the flooring according to the present invention (Example) was indented when the straight screwdriver was dropped from a height of 100 cm.

The surface breakage properties were evaluated by dropping an iron ball having a diameter of 3 cm and a weight of 228 g onto the surface of the floorings and measuring a height at which surface breakage was observed. As can be seen from the data shown in Table 1, the surface of the laminate flooring (Comparative Example 2) was broken when the iron ball was dropped from a height of 30 cm, while the surface of the flooring according to the present invention (Example) was indented when the iron ball was dropped from a height of 150 cm, which was three times higher than 50 cm.

These experimental results lead to the conclusion that the flooring of the present invention had excellent protective effects against damage to the surface, e.g., indentation and breakage, caused by a heavy or sharp object when compared to the conventional laminate flooring having a surface layer made of a melamine resin.

INDUSTRIAL APPLICABILITY

As apparent from the above description, due to the presence of the protective layer of the surface layer, the flooring of the present invention shows improved surface physical properties. That is, the surface of the flooring is protected against damage, e.g., surface indentation and breakage, caused by a heavy or sharp object, which are main disadvantages of the conventional plywood flooring comprising a natural veneer and a waterproof plywood.

In addition, the conventional plywood flooring using a natural veneer as a main surface material causes damage to forest resources, while the flooring of the present invention provides a natural texture by printing effects, which is advantageous in terms of natural resource preservation.

Furthermore, since the conventional laminate flooring comprises a surface layer made of a melamine resin, it has the problems of bending and distortion due to changes in ambient atmospheric conditions, e.g., moisture and temperature. Accordingly, an additional balance layer must be formed on the bottom surface of the conventional laminate flooring, result in a structural disadvantage. In contrast, since the flooring of the present invention exhibits a stabilized dimensional variation despite changes in humidity and temperature when compared to a melamine resin, it avoids the need of an additional balance layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A flooring comprising a wood-based board as a base, a bottom layer laminated under the wood-based board, and a surface layer laminated on the wood-based board,
    wherein the surface layer includes a printed layer, a protective layer and a surface treatment layer;
    the protective layer has a composition comprising 10~50 parts by weight of a ethylene vinyl acetate (EVA), and 100 parts by weight of glycol-modified polyethylene terephthalate (PETG), and
    the printed layer and the bottom layer are made of glycol-modified polyethylene terephthalate (PETG).

2. The flooring according to claim 1, wherein the printed layer consists of a base layer for printing made of a synthetic resin and a printed surface formed on the base layer.

3. The flooring according to claim 1, wherein the printed layer is formed of a printed paper or a resin-impregnated printed paper obtained by printing a paper and impregnating the printed paper with a synthetic resin.

4. The flooring according to claim 1, wherein the printed layer consists of a glass fiber layer formed by impregnating a glass fiber sheet with a synthetic resin, a base layer for printing made of a synthetic resin laminated on the glass fiber layer, and a printed surface formed on the base layer.

5. The flooring according to claim 1, wherein the wood-based board is at least one board selected from a waterproof plywood, a medium-density fiberboard (MDF), a high-density fiberboard (HDF), a particle board, or a resin-wood flour composite board.

6. The flooring according to claim 1, wherein the flooring is processed into a tongue and groove (T & G) shape.

7. The flooring according to claim 1, wherein the surface layer is embossed.

8. A flooring comprising a wood-based board as a base, a bottom layer laminated under the wood-based board, and a surface layer laminated on the wood-based board,
    wherein the surface layer includes a printed layer, a protective layer and a surface treatment layer;
    the protective layer has a composition comprising 30 parts by weight of ethylene vinyl acetate (EVA) and 100 parts by weight of glycol-modified polyethylene terephthalate (PETG); and
    the printed layer and the bottom layer are made of glycol-modified polyethylene terephthalate (PETG).

* * * * *